United States Patent
Yang et al.

(10) Patent No.: US 8,023,289 B2
(45) Date of Patent: *Sep. 20, 2011

(54) OFFLINE SYNCHRONOUS RECTIFIER WITH CAUSAL CIRCUIT FOR RESONANT SWITCHING POWER CONVERTER

(75) Inventors: Ta-Yung Yang, Milpitas, CA (US);
Ying-Chieh Su, Taipei County (TW);
Chou-Sheng Wang, Keelung (TW);
Tien-Chi Lin, Taipei County (TW);
Jhih-Da Hsu, Taipei County (TW)

(73) Assignee: System General Corp., Taipei Hsien (TW)

( * ) Notice: Subject to any disclaimer, the term of this patent is extended or adjusted under 35 U.S.C. 154(b) by 348 days.

This patent is subject to a terminal disclaimer.

(21) Appl. No.: 12/275,174

(22) Filed: Nov. 20, 2008

(65) Prior Publication Data

US 2010/0124079 A1    May 20, 2010

(51) Int. Cl.
*H02M 3/335* (2006.01)
*H02M 5/42* (2006.01)
(52) U.S. Cl. .............. 363/21.02; 363/21.06; 363/89
(58) Field of Classification Search .......... 363/21.06, 363/21.02, 127, 89
See application file for complete search history.

(56) References Cited

U.S. PATENT DOCUMENTS

| | | | |
|---|---|---|---|
| 7,564,705 B2 * | 7/2009 | Yang | 363/89 |
| 7,701,736 B2 * | 4/2010 | Yang et al. | 363/89 |
| 7,764,516 B2 * | 7/2010 | Yang | 363/21.06 |
| 2009/0257250 A1 * | 10/2009 | Liu | 363/21.06 |
| 2010/0014324 A1 * | 1/2010 | Yang et al. | 363/21.06 |
| 2010/0054008 A1 * | 3/2010 | Schaible et al. | 363/127 |
| 2010/0097104 A1 * | 4/2010 | Yang et al. | 327/103 |
| 2010/0118565 A1 * | 5/2010 | Stuler | 363/21.08 |

* cited by examiner

*Primary Examiner* — Jeffrey L Sterrett
*Assistant Examiner* — Gary Nash
(74) *Attorney, Agent, or Firm* — Jianq Chyun IP Office

(57) ABSTRACT

A synchronous rectifier of a resonant switching power converter is provided to improve efficiency. The synchronous rectifier includes a power transistor and a diode connected to a transformer and an output of the resonant switching power converter for ratifications. A controller generates a drive signal to control the power transistor in response to an on signal and an off signal. A causal circuit is developed to generate the off signal in accordance with the on signal. The on signal is enabled once the diode is forward biased. The on signal is coupled to enable the drive signal for switching on the power transistor. The off signal is coupled to disable the drive signal for switching off the power transistor. The off signal is enabled before the on signal is disabled.

7 Claims, 4 Drawing Sheets

US 8,023,289 B2

OFFLINE SYNCHRONOUS RECTIFIER WITH CAUSAL CIRCUIT FOR RESONANT SWITCHING POWER CONVERTER

BACKGROUND OF THE INVENTION

1. Filed of Invention

The present invention relates to a power converter, and more particularly, relates to a synchronous rectifier for a resonant switching power converter.

2. Description of Related Art

FIG. 1 shows a schematic circuit of a resonant switching power converter. The resonant switching power converter includes a transformer 10 to provide isolation from a line input voltage $V_{IN}$ to an output voltage $V_O$ of the resonant switching power converter for safety. Switches 20 and 30 develop a half bridge circuit to switch a resonant tank and the transformer 10. An inductor 5 and a capacitor 40 form the resonant tank. The inductor 5 can be an inductance device or the leakage inductance of a primary winding $N_P$ of the transformer 10. The inductance L of the inductor 5 and the capacitance C of the capacitor 40 determine a resonance frequency $f_0$ of the resonant tank.

$$f_0 = \frac{1}{2\pi\sqrt{L \times C}} \quad (1)$$

The transformer 10 transfers the energy from the primary winding $N_P$ to secondary windings $N_{S1}$, $N_{S2}$ of the transformer 10. Rectifiers 61, 62 and a capacitor 65 perform the rectifying and filtering function to the transformer 10 for generating the output voltage $V_O$ (DC voltage) at the output of the power converter. The detailed skill of the resonant switching power converter can be found in a text book titled "Resonant Power Converters" by Marian K. Kazimierczuk and Dariusz Czarkowski, 1995 by John Wiley & Sons, Inc.

Although the resonant switching of the power converter can achieve high efficiency and low EMI (electric-magnetic interference) performance, a forward voltage of rectifiers 61 and 62 still causes significant power losses. The present invention is accordingly directed to a synchronous rectifier for a resonant switching power converter to achieve higher efficiency.

SUMMARY OF THE INVENTION

A synchronous rectifier for a resonant switching power converter includes a power transistor and a diode connected to a transformer and an output of the resonant switching power converter for rectification. A controller generates a drive signal to control the power transistor in response to an on signal and an off signal. A causal circuit is developed to generate the off signal in accordance with the on signal. The on signal is enabled once the diode is forward biased. The on signal is coupled to enable the drive signal for switching on the power transistor. The off signal is coupled to disable the drive signal for switching off the power transistor. The off signal is enabled before the on signal is disabled.

The controller includes an inner-lock circuit for generating an inner-lock signal in response to the enabling of the drive signal. The driver signal can only be enabled once the inner-lock signal is disabled. A maximum-on-time circuit generates a maximum-on-time signal coupled to turn off the power transistor for limiting a maximum on time of the power transistor.

BRIEF DESCRIPTION OF ACCOMPANIED DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF EMBODIMENTS

Figure 1:
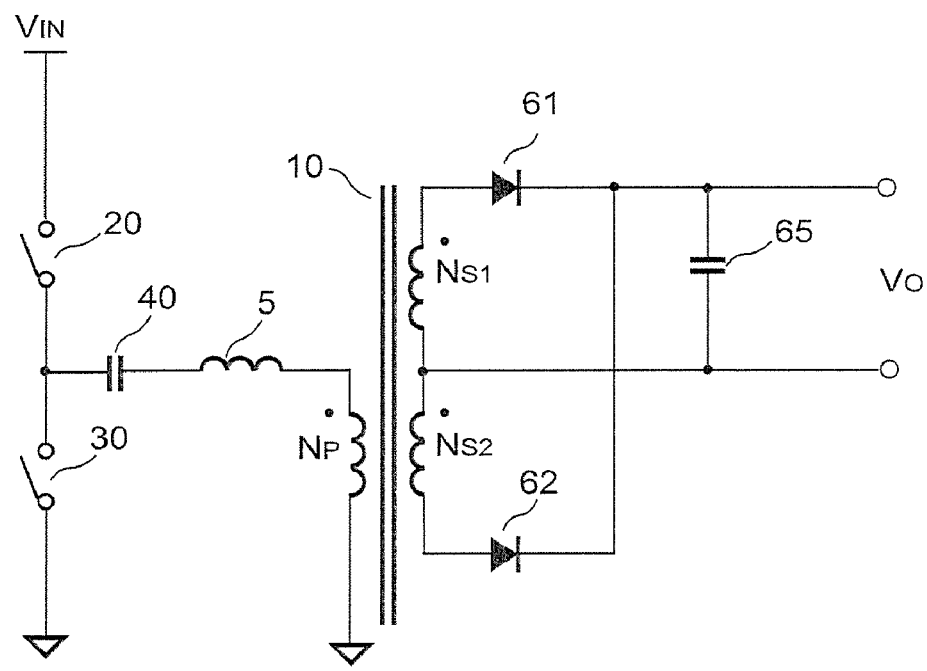
FIG. 1 shows a schematic circuit of a resonant switching power converter.
Figure 2:
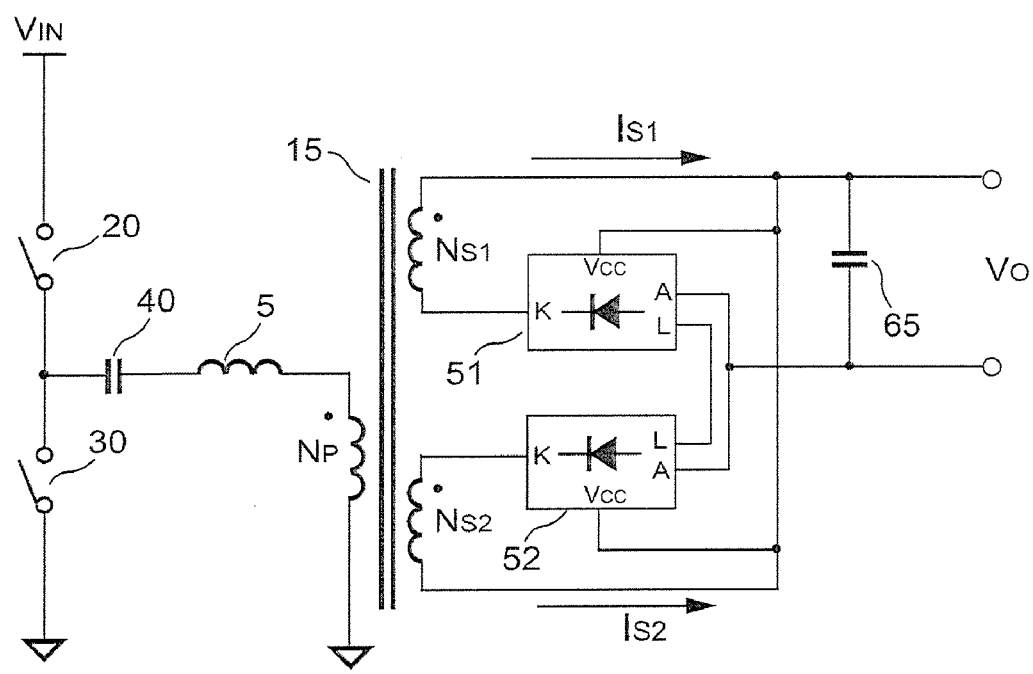
FIG. 2 shows an embodiment of a synchronous rectifier of a resonant switching power converter according to the present invention.

FIG. 2 shows a resonant switching power converter with an integrated synchronous rectifier (a synchronous rectifying circuit) as an embodiment of the present invention. The resonant switching power converter includes a transformer 15 having a primary winding $N_P$ and secondary windings $N_{S1}$, $N_{S2}$. The primary winding $N_P$ of the transformer 15 has two switches 20 and 30 for switching the primary winding $N_P$ of the transformer 15. An integrated synchronous rectifier 51 has a cathode terminal K connected to the secondary winding $N_{S1}$. An anode terminal A of the integrated synchronous rectifier 51 is connected to an output ground of the resonant switching power converter. An integrated synchronous rectifier 52 having the cathode terminal K and the anode terminal A is also connected from the secondary winding $N_{S2}$ to the output ground of the resonant switching power converter.

Figure 3:
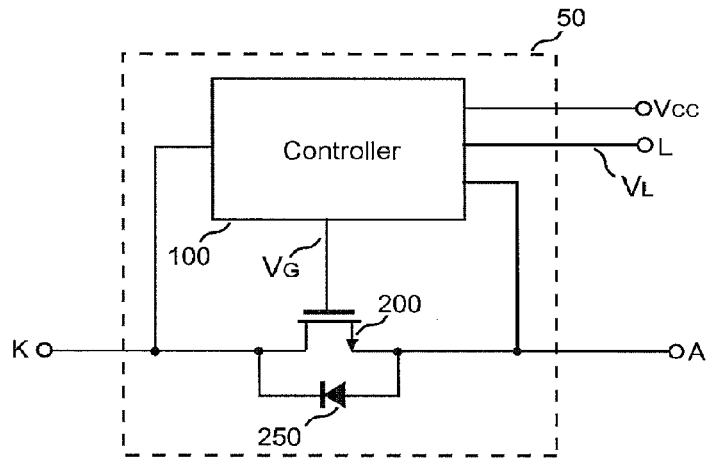
FIG. 3 is a schematic diagram of an integrated synchronous rectifier according to an embodiment of the present invention.

The inner-lock terminals L of Integrated synchronous rectifiers 51 and 52 generate an inner-lock signal to prevent the integrated synchronous rectifiers 51 and 52 from being turned on simultaneously. The integrated synchronous rectifier 51 is disabled once a switching current $I_{S1}$ is lower than a current threshold. The integrated synchronous rectifier 52 is also disabled once a switching current $I_{S2}$ is lower than the current threshold. FIG. 3 is a schematic diagram of an integrated synchronous rectifier 50 according to the present invention. It represents an embodiment of the circuit of the integrated synchronous rectifier 51 or the integrated synchronous rectifier 52, as shown in FIG. 2. The integrated synchronous rectifier 50 includes a power transistor 200, a diode 250, and a controller 100. The controller 100 generates a drive signal $V_G$ to control the power transistor 200. The diode 250 is connected to the power transistor 200 in parallel. Here, the diode 250 is a Schottky diode or a parasitic device of the power transistor 200. The power transistor 200 is connected between the cathode terminal K and the anode terminal A. The cathode terminal K is coupled to the secondary winding of the transformer 15. The anode terminal A is coupled to the output of the resonant switching power converter. The controller 100 generates a signal to enable the drive signal $V_G$ and turns on the power transistor 200 once the diode 250 is forward biased. The controller 100 generates another signal to disable the drive signal $V_G$ and turns off the power transistor 200 in response to a period of an on signal (EN), which is the result of comparison between the voltage level of the cathode terminal K and a threshold, which will introduce hereafter.

Figure 4:
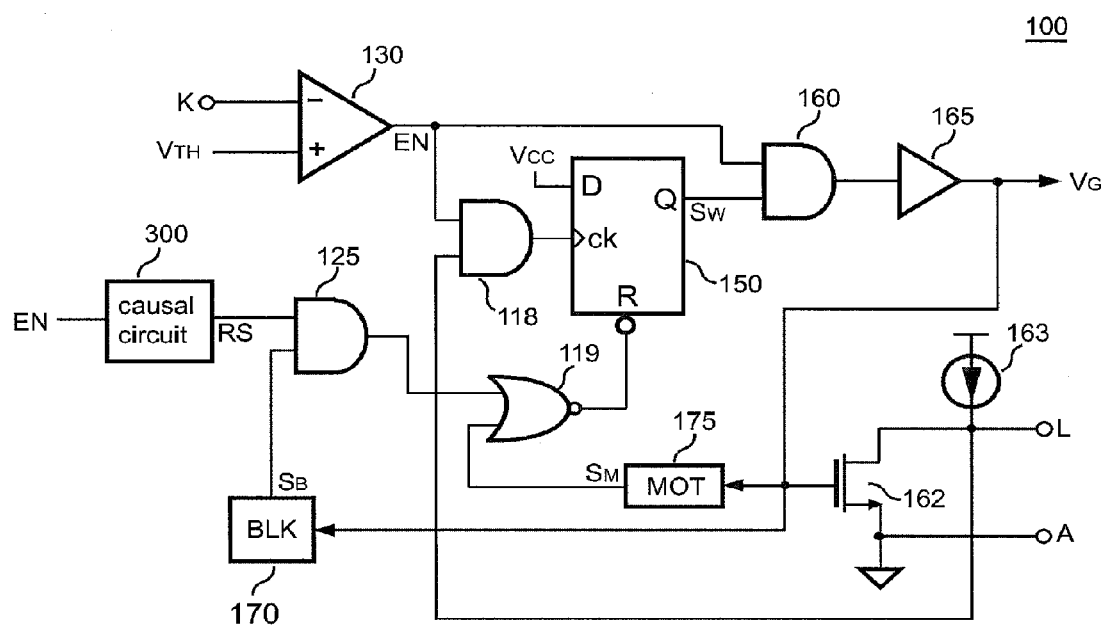
FIG. 4 shows an embodiment of a controller of the integrated synchronous rectifier according to the present invention.

An inner-lock terminal L outputs the inner-lock signal $V_L$ to show the on or off status of the power transistor 200. The off signal is enabled before the on signal is disabled. FIG. 4 shows a schematic diagram of a preferred embodiment of the controller 100 of the integrated synchronous rectifier 50 according to the present invention. A threshold $V_{TH}$ is connected to the positive input of the comparator 130. The negative input of the comparator 130 is coupled to the cathode terminal K. An output of the comparator 130 generates the on signal EN. Through an AND gate 118, the on signal EN and the inner-lock signal $V_L$ are coupled to a clock-input terminal ("CK") of a D flip-flop 150. A reset-input terminal ("R") of the D flip-flop 150 is controlled by an output of an NOR gate 119. An output (a signal $S_W$) of the D flip-flop 150 and the on signal EN are connected to an AND gate 160. The D flip-flop 150 is operated as a latch circuit. An output of the AND gate 160 is connected to an output buffer 165. The drive signal $V_G$ is generated at an output of the output buffer 165 for controlling the power transistor 200 of FIG. 3. An inner-lock circuit is developed by a transistor 162 and a current source 163. The drive signal $V_G$ is connected to the transistor 162 to generate the inner-lock signal $V_L$. The inner-lock signal $V_L$ is generated in response to the enabling of the drive signal $V_G$. The drive signal $V_G$ can only be initiated and enabled once the inner-lock signal $V_L$ is disabled.

The maximum on time of the drive signal $V_G$ is limited by a maximum-on-time circuit (MOT) 175. The drive signal $V_G$ is connected to an input of the maximum-on-time circuit 175. A maximum-on-time signal $S_M$ is produced in response to the enabling of the drive signal $V_G$ after a delay time. The maximum-on-time signal $S_M$ is connected to a reset-input terminal ("R") of the D flip-flop 150 through the NOR gate 119 to clear the D flip-flop 150. The maximum on time of the drive signal $V_G$ is thus limited by the delay time of the maximum-on-time circuit 175. The drive signal $V_G$ is generated to turn on the power transistor 200 once the voltage of the cathode terminal K is lower than the threshold voltage $V_{TH}$ (the diode 250 is turned on).

Another input of the NOR gate 119 is connected to an output of an AND gate 125. A first input of the AND gate 125 is coupled to an output (a blanking signal $S_B$) of a blanking circuit (BLK) 170. An input of the blanking circuit 170 is connected to the drive signal $V_G$. The blanking circuit 170 provides a blanking time to achieve a minimum on time for the drive signal $V_G$. A causal circuit (PL) 300 generates an off signal RS connected to a second input of the AND gate 125. The off signal RS is generated in response to the on signal EN. The off signal RS is developed to turn off the driver signal $V_G$. The voltage of the cathode terminal K is lower than the voltage of the threshold $V_{TH}$ when the diode 250 is conducted and forward biased. Therefore, the power transistor 200 can only be turned on after the diode 250 is turned on, which achieves the soft-switching of the power transistor 200. Furthermore, the drive signal $V_G$ is disabled and the power transistor 200 is turned off when the diode 250 is reversely biased.

Moreover, the off signal RS is coupled to turn off the power transistor 200 in accordance with the operation of the causal circuit 300.

Figure 5:
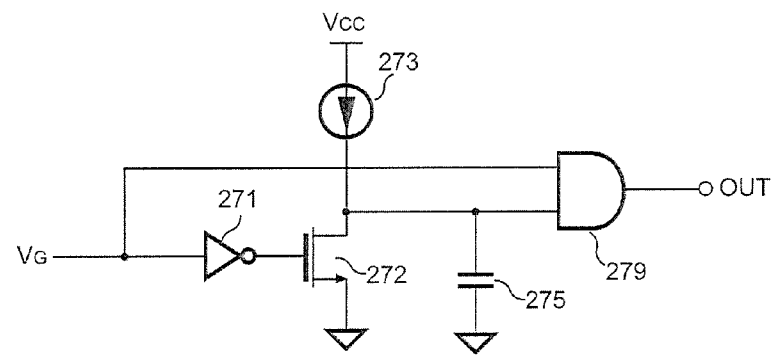
FIG. 5 is a schematic circuit for a maximum-on-time (MOT) circuit and a blanking circuit (BLK) according to an embodiment of the controller of the integrated synchronous rectifier according to the present invention.

FIG. 5 is a schematic circuit of an embodiment of the maximum-on-time circuit (MOT) 175 (and the blanking circuit 170) of controller 100 of the integrated synchronous rectifier 50 according to the present invention. A current source 273 is connected to charge a capacitor 275. A transistor 272 is connected to discharge the capacitor 275. The drive signal $V_G$ is connected to control the transistor 272 through an inverter 271. The drive signal $V_G$ is further connected to an input of an AND gate 279. Another input of the AND gate 279 is coupled to the capacitor 275. Once the drive signal $V_G$ is enabled, an output OUT of the AND gate 279 generates the maximum-on-time signal $S_M$ (the blanking signal $S_B$) to disable the drive signal $V_G$ after the delay (blanking) time. The delay (blanking) time is determined by the current of the current source 273 and the capacitance of the capacitor 275.

Figure 6:
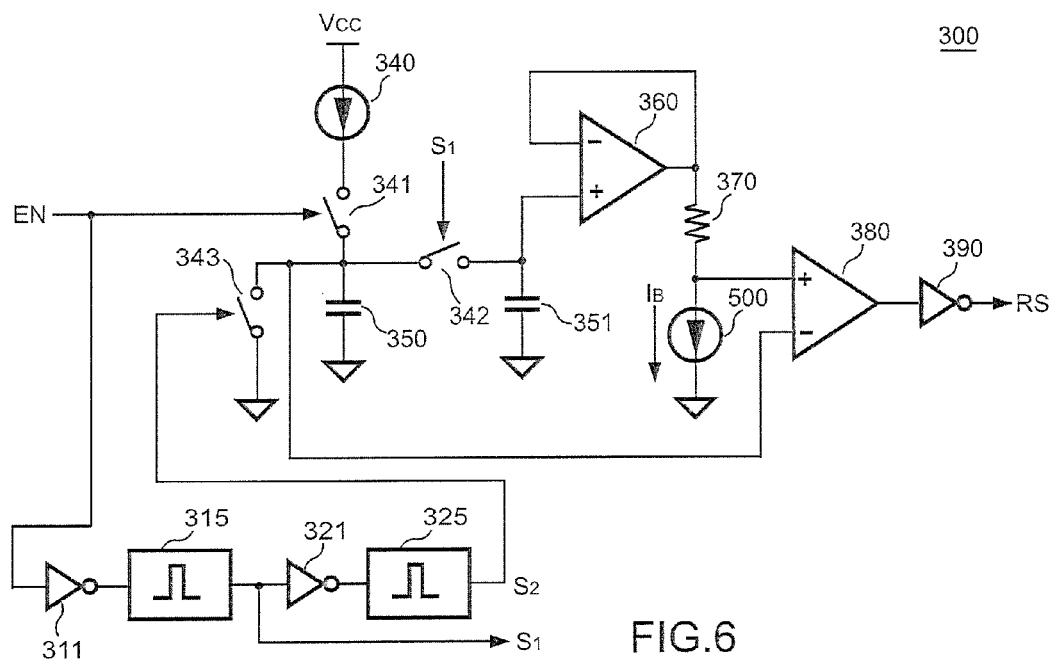
FIG. 6 shows a schematic circuit for causal circuit of the controller of the integrated synchronous rectifier according to the present invention.

FIG. 6 shows the causal circuit 300 of the controller 100 according to the present invention. The on signal EN is coupled to enable the charge of a capacitor 350 through a switch 341 and a current source 340. A ramp signal is thus generated at the capacitor 350. The on signal EN is further coupled to generate a sample signal S1 and a clear signal S2 through pulse generation circuits 315, 325 and inverters 311, 321. The sample signal S1 is coupled to sample the signal of the capacitor 350 to a capacitor 351 via a switch 342. After the sampling, the clear signal S2 is coupled to clear the capacitor 350 through a switch 343. A level of the signal of the capacitor 351 is correlated to an enabling period of the on signal EN. The signal of the capacitor 351 is coupled to a positive input of a comparator 380 through a buffer amplifier 360 and a resistor 370. A current source 500 is further coupled to the resistor 370 to generate a voltage drop at the resistor 370. Another input (negative input) of the comparator 380 is connected to the ramp signal. An output of the comparator 380 is connected to an inverter 390. The inverter 390 generates the off signal RS to disable the drive signal $V_G$. A current $I_B$ of the current source 500 is adjusted to generate the off signal RS. The off signal RS is enabled before the on signal EN is disabled. A level of the hold signal is correlated to a period of the on signal EN. The comparator 380 generates the off signal RS in response to the comparison of the ramp signal and the hold signal. So that the causal circuit 300 generates an off signal RS to disable the drive signal $V_G$ and turns off the power transistor 200 in response to a period of the on signal EN.

Figure 7:
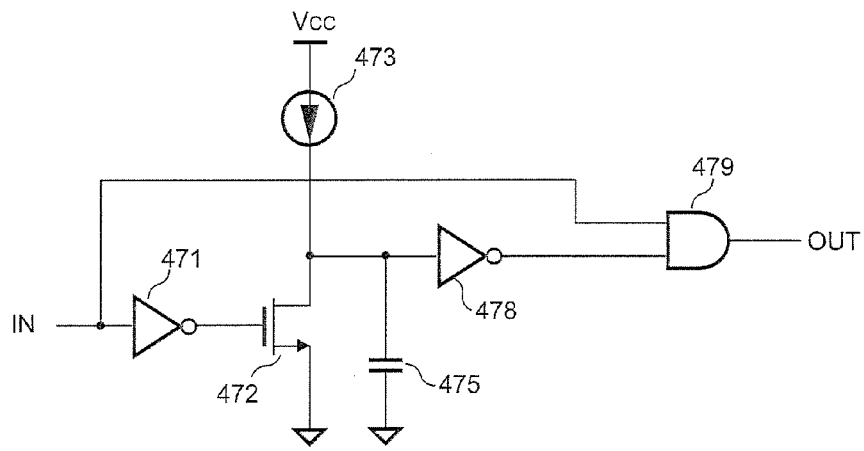
FIG. 7 shows a schematic circuit for pulse generation circuit of the controller of the integrated synchronous rectifier according to the present invention.

FIG. 7 shows an embodiment of a pulse generation circuit for the pulse generation circuits 315 or 325 of FIG. 6. A current source 473 is connected to charge a capacitor 475. A transistor 472 is connected to discharge the capacitor 475. A signal IN is connected to control the transistor 472 through an inverter 471. The signal IN is further connected to an input of an AND gate 479. Another input of the AND gate 479 is coupled to the capacitor 475 via an inverter 478. The pulse width of the output pulse signal is determined by the current of the current source 473 and the capacitance of the capacitor 475.

Figure 8:
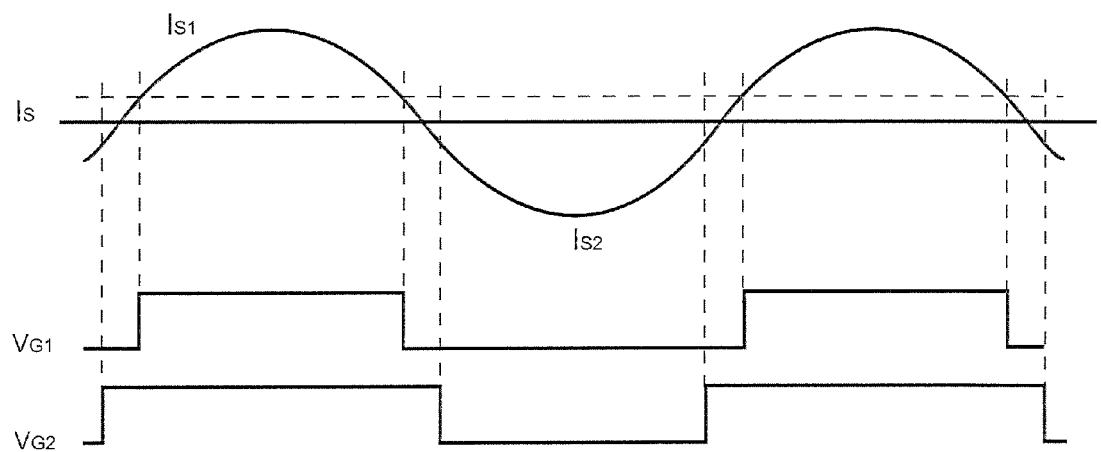
FIG. 8 shows key waveforms of the synchronous rectifier according to the present invention.

FIG. 8 shows key waveforms of the synchronous rectifier of the present invention. The switching current $I_S$ of the transformer 15 including $I_{S1}$ and $I_{S2}$. The drive signals $V_{G1}$ and $V_{G2}$ are the drive signal $V_G$ of the integrated synchronous rectifier 51 and the integrated synchronous rectifier 52, respectively.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A synchronous rectifier of a resonant switching power converter, comprising:
    a power transistor and a diode, coupled to a transformer and an output of the resonant switching power converter for rectification;
    a controller, generating a drive signal to control the power transistor in response to an on signal and an off signal; and
    a causal circuit, generating the off signal in accordance with the on signal, wherein the on signal is enabled once the diode is forward biased, the on signal is coupled to enable the drive signal for switching on the power transistor, and the off signal is coupled to disable the drive signal for switching off the power transistor.

2. The synchronous rectifier as claimed in claim 1, wherein the off signal is enabled before the on signal is disabled.

3. The synchronous rectifier as claimed in claim 1, wherein the causal circuit comprises:
    a charge circuit, generating a ramp signal when the on signal is enabled;
    a sampled circuit, generating a hold signal in accordance with a level of the ramp signal;
    a comparator, generating the off signal in response to the comparison of the ramp signal and the hold signal, wherein a level of the hold signal is correlated to a period of the on signal.

4. The synchronous rectifier as claimed in claim 1, wherein the controller comprises:
    a latch circuit, generating the drive signal to control the power transistor, wherein the drive signal is enabled in response to the enabling of the on signal, and the drive signal is disabled in response to the enabling of the off signal.

5. The synchronous rectifier as claimed in claim 1, wherein the controller comprises:
    an inner-lock circuit, generating an inner-lock signal in response to the enabling of the drive signal, wherein the driver signal is enabled once the inner-lock signal is disabled.

6. The synchronous rectifier as claimed in claim 1, wherein the controller comprises:
    a maximum-on-time circuit, generating a maximum-on-time signal, wherein the maximum-on-time signal is coupled to turn off the power transistor for limiting a maximum on time of the power transistor.

7. The synchronous rectifier as claimed in claim 1, wherein the controller comprises:
    a minimum-on-time circuit, generating a blanking signal, wherein the blanking signal is coupled to a latch for generating the drive signal with a minimum-on-time once the drive signal is generated.

* * * * *